United States Patent
Speier et al.

(10) Patent No.: US 7,421,529 B2
(45) Date of Patent: Sep. 2, 2008

(54) METHOD AND APPARATUS TO CLEAR SEMAPHORE RESERVATION FOR EXCLUSIVE ACCESS TO SHARED MEMORY

(75) Inventors: Thomas Philip Speier, Holly Springs, NC (US); James Norris Dieffenderfer, Apex, NC (US); Thomas Andrew Sartorius, Raleigh, NC (US); Jaya Prakash Subramaniam Ganasan, Youngsville, NC (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 11/254,391

(22) Filed: Oct. 20, 2005

(65) Prior Publication Data

US 2007/0094430 A1   Apr. 26, 2007

(51) Int. Cl.
*G06F 12/14* (2006.01)
(52) U.S. Cl. .................. 710/200; 711/147; 719/312
(58) Field of Classification Search .............. 710/200, 710/3, 18, 107, 108; 711/154, 163, 152, 711/148, 147, 150; 719/312
See application file for complete search history.

(56) References Cited

U.S. PATENT DOCUMENTS

| | | | |
|---|---|---|---|
| 4,456,965 A * | 6/1984 | Graber et al. ............... | 710/100 |
| 4,594,657 A * | 6/1986 | Byrns ......................... | 710/241 |
| 4,841,435 A | 6/1989 | Papenberg | |
| 5,408,629 A | 4/1995 | Tsuchiya et al. | |
| 5,530,845 A * | 6/1996 | Hiatt et al. .................. | 703/27 |
| 5,548,780 A * | 8/1996 | Krein .......................... | 710/5 |
| 6,018,688 A * | 1/2000 | Hashimoto ................ | 700/215 |
| 6,052,763 A * | 4/2000 | Maruyama .................. | 711/152 |
| 6,513,089 B1 * | 1/2003 | Hofmann et al. ........... | 710/309 |
| 6,587,905 B1 * | 7/2003 | Correale et al. ............. | 710/107 |
| 6,745,274 B1 * | 6/2004 | Snyder et al. ............... | 710/240 |
| 6,898,709 B1 * | 5/2005 | Teppler ...................... | 713/178 |
| 6,954,844 B2 * | 10/2005 | Lentz et al. .................. | 712/29 |
| 2004/0024987 A1 | 2/2004 | Lentz et al. | |
| 2004/0059818 A1 * | 3/2004 | Snyder et al. ............... | 709/226 |
| 2005/0160272 A1 * | 7/2005 | Teppler ...................... | 713/178 |
| 2005/0201302 A1 * | 9/2005 | Gaddis et al. ............... | 370/254 |
| 2006/0047919 A1 * | 3/2006 | Jenkins et al. .............. | 711/150 |
| 2006/0080536 A1 * | 4/2006 | Teppler ...................... | 713/176 |

OTHER PUBLICATIONS

"Distributed synchronization with shared semaphore sets" by Tapus et al. (abstract only) Publication Date: May 9-12, 2005.*

* cited by examiner

*Primary Examiner*—Clifford H Knoll
(74) *Attorney, Agent, or Firm*—Nicholas J. Pauley; Joseph B. Agusta; Thomas Rouse

(57) ABSTRACT

Semaphore operation manages exclusive access to a memory that is shared by a plurality of processing elements. Semaphore reservation status for exclusive access by a processing element is monitored by a memory controller. To clear an obsolete reservation status, a command signal is transmitted for a write operation to the memory while prohibiting update of the contents of a memory. The reservation status at the controller is changed from a reservation state to a non-reservation state in response to receipt of the command signal.

16 Claims, 2 Drawing Sheets

METHOD AND APPARATUS TO CLEAR SEMAPHORE RESERVATION FOR EXCLUSIVE ACCESS TO SHARED MEMORY

BACKGROUND

1. Field

The present disclosure relates to processing systems having shared memory, more particularly to method and apparatus for clearing semaphore reservations.

2. Background

Computers have revolutionized the electronics industry by enabling sophisticated processing tasks to be performed with just a few strokes of a keypad. These sophisticated tasks involve an incredibly high number of complex components that communicate with one another in a fast and efficient manner using a bus. A bus is a channel or path between components in a computer.

Many buses resident in a computer have traditionally been implemented as shared buses. A shared bus provides a means for any number of components to communicate over a common path or channel. In recent years, shared bus technology has been replaced to a large extent by point-to-point switching connections. Point-to-point switching connections provide a direct connection between two components on the bus while they are communicating with each other. Multiple direct links may be used to allow several components to communicate at the same time. A bus arbiter may be used to manage communications over the bus.

A computer implementing a bus architecture may include a number of processing components connected to memory. The memory may be divided into regions either by the system designer or dynamically during operation. Each processing component may have its own dedicated memory region. "Shared memory regions," on the other hand, are memory regions that may be accessed by multiple processing. A semaphore may be used to manage access to the shared memory regions. A "semaphore" is a hardware or software flag, residing in a shared memory location, that indicates the accessibility of a shared resource. A processing component that needs access to the shared memory region may read the semaphore to determine the accessibility of the shared memory region. If the semaphore indicates that the shared memory region is available, then the processing component may set the semaphore to indicate that the shared memory region is locked, and proceed to access the memory.

When the processing component reads the semaphore, the memory creates a "reservation" for the processing component to the shared memory region. The reservation is cleared once the processing component sets the semaphore to lock the shared memory region. However, if the processor is interrupted before it has a chance to set the semaphore, the reservation must be cleared. An efficient means for clearing the semaphore reservation is desirable.

SUMMARY

A method of clearing a semaphore reservation for exclusive access to a shared memory is disclosed. The method includes transmitting a write request to a semaphore memory region associated with the shared memory, and prohibiting update of the contents of the semaphore memory region in response to the write request.

A processing system is disclosed. The processing system includes a plurality of processing components, a memory comprising a shared memory region that can be shared by the processing components and a semaphore memory region that is indicative of exclusive write access availability of the shared memory portion, and a controller that maintains semaphore reservation status, wherein a reserved status of said controller is cleared in response to a write request to the semaphore memory region from one of the processing components without data being written to the semaphore memory region.

Another processing system is disclosed. The processing system includes a plurality of processing components, a memory comprising a shared memory region that can be shared by said plurality of processing components and a semaphore memory region that is indicative of exclusive write access availability of the shared memory portion, and a controller that maintains semaphore reservation status, wherein each of the processing components is configured to transmit a write request to the semaphored memory region that clears a semaphore reserved status without writing to the semaphore memory region.

This disclosed technique provides advantages in that the semaphore reservation can be cleared without occupying additional memory and avoids memory accessing steps. Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which.

DETAILED DESCRIPTION

Figure 1:
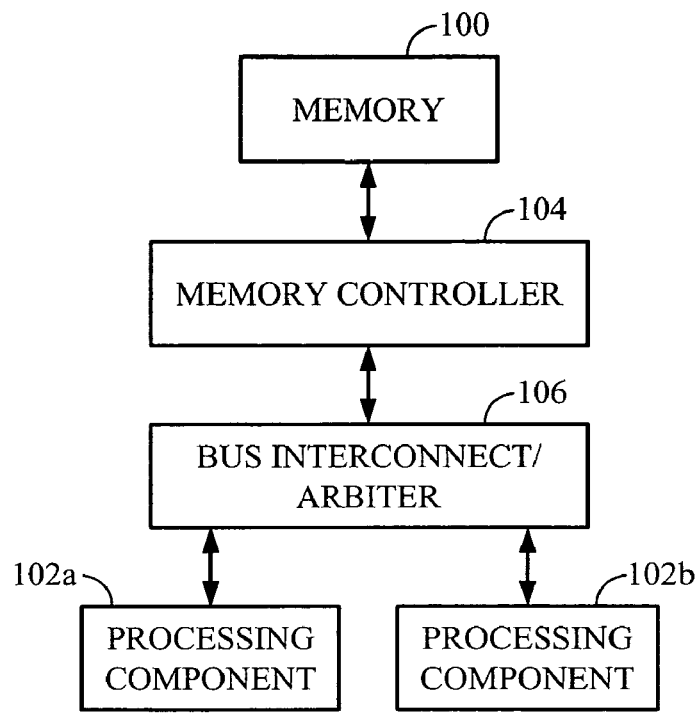
FIG. 1 is a functional block diagram illustrating an example of a processing system.

FIG. 1 is a functional block diagram illustrating an example of a processing system. The processing system may be a computer, or resident in a computer, and capable of processing, retrieving and storing information. The processing system may be a stand-alone system, or embedded in a device, such as a wired or wireless phone, personal digital assistant (PDA), laptop, desktop computer (PC), pager, modem, game console, digital camera, video conferencing equipment, broadcast equipment, or any other suitable device that requires data processing capability. Memory 100 is coupled to one or more processing components 102a and 102b through memory controller 104 and system bus interconnect and bus arbiter 106. Each processing component may be any type of bus mastering component including, by way of example, a microprocessor, a digital signal processor (DSP), a bridge, programmable logic, discrete gate or transistor logic, or any other information processing component. Although only two processing components are shown for simplicity of illustration, a greater number may be employed.

The memory may be divided into regions either by a system designer or dynamically during operation. A memory region may be dedicated to each processing component, while other regions of the memory may be shared for access by multiple processing components. The term "memory region" refers to any memory device, any portion of a memory device, a memory map region, or the like. A shared common memory resource may be any type of bus slave component including, by way of example, a register, memory, a bridge, or any other component capable of retrieving and storing information.

Typically, the bus arbiter is coupled to the bus in order to manage memory access in an effective manner. For example, processing component 102a, seeking access to a shared memory region, may broadcast a read or write request to the bus arbiter through the bus. The bus arbiter may then grant the requesting processing component 102a access to the shared memory region to perform the read or write operation. In the event that multiple read and/or write requests from one or more processing components contend at the bus arbiter, the bus arbiter may then determine the sequence in which the read and/or write operations will be performed and dynamically configure bus interconnection according to a bus arbitration scheme. The bus arbitration scheme may vary depending on the specific application and overall design constraints. Access to memory may be based on a balance between priority criteria and equitable distribution considerations.

A processor may broadcast a read request by placing an address on an address bus. A write request may be made in a similar fashion, with the addition of data being placed on a data bus. The address bus and data bus may be separate buses, or a single time-shared bus. Sideband signaling may be employed to provide the appropriate control signals to the memory controller 104. Alternatively, the control signals can be multiplexed with the address and data, either on separate buses or a single time-shared bus. The control signals may include, by way of example, a read/write strobe, an exclusive or non-exclusive operation, payload size signal, and in the case of a write operation, write byte enables. "Write byte enables" may be used to indicate which byte lanes on the bus will be used to broadcast the data for the write operation. By way of example, a 2-byte payload broadcast on a 32-bit data bus may use 2 of the 4 byte lanes. The write byte enables may be used to indicate to the memory controller which of the 2 byte lanes on the data bus will be used to broadcast the payload.

Figure 2:
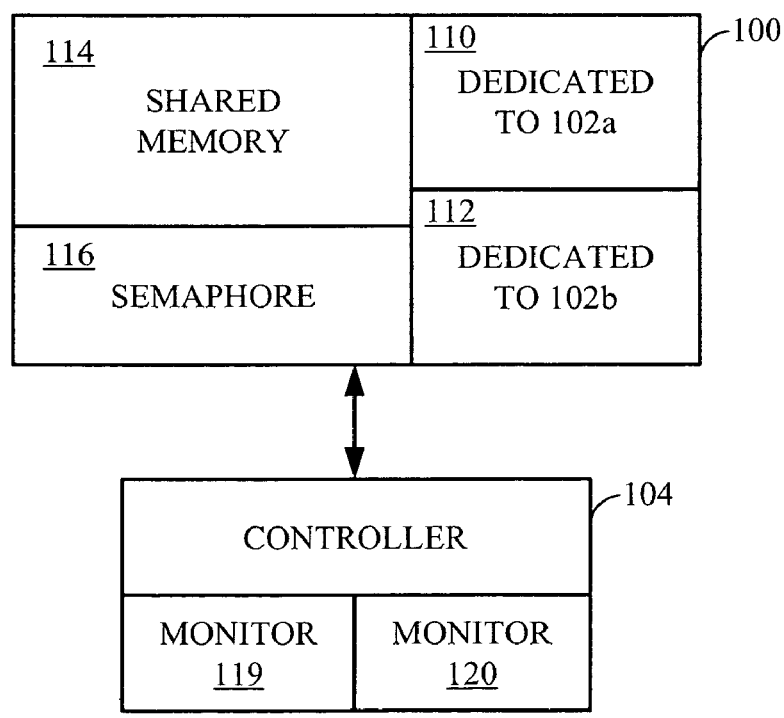
FIG. 2 is a more detailed partial block diagram of elements of the processing system.

Processing applications often require exclusive access to write to a shared memory region during an uninterrupted sequence of operations. The processing system must provide appropriate memory access management to processors that require such exclusive access. FIG. 2 is a more detailed block diagram of the memory 100 and memory controller 104. Exclusive accessibility to shared memory is governed by "semaphore" operation. Memory 100 is divided into regions. Memory regions 110 and 112, respectively, are dedicated to processors 102a and 102b. Memory region 114 is a memory region that is shared by multiple processors. If appropriate to particular system usage, this region can be further divided into portions that are each shared by specific processors of a multiple processor system. Region 116 is dedicated to semaphore storage.

Memory controller 104 includes exclusive state machine monitors 119 and 120. Monitor 119 is an exclusive monitor associated with processor 102a, to monitor and control exclusive access operations of that processor to shared memory 114. Monitor 120 is an exclusive monitor associated with processor 102b.

As explained earlier in the background portion of the disclosure, a semaphore is a flag that resides in semaphore memory region 116 and is indicative of accessibility or non-accessibility of the shared memory resource 114. A processing component that seeks exclusive access to the shared memory region can read the semaphore memory region, via the associated memory controller monitor, to determine the accessibility of the shared memory region or memory region portion. If the semaphore indicates that the shared memory region is available for access, then the memory controller may set a flag in the semaphore region to indicate that the shared memory region is "locked," and proceed to access the memory for writing into the shared memory region 114 by the associated processor. During the locked state of the semaphore, no other processing component is able to access the shared memory. Upon completion of the processing operations, the flag is removed by the memory controller and the semaphore returns to an unlocked state, indicative of accessibility.

A semaphore reservation scheme is typically invoked for managing exclusive access to shared memory. As a prerequisite to gaining exclusive write access to shared memory, a reservation must be established for the requesting processor in its associated memory controller monitor. The controller sets a reservation state when a semaphore read operation takes place. As an example, an instruction code sequence may require exclusive access by processor 102a to write to locations in the shared memory region 114. In order to execute a write exclusive request by the processor, the semaphore must first be read to determine whether region 114 can be accessed by processor 102a. The semaphore read operation initiates the controller to set a reservation state for processor 102a in monitor 119.

If the shared memory region is not locked, processor 102a may immediately gain access or wait to later in the code sequence. Processor 102b may also establish a reservation state in monitor 120 if the semaphore is not locked. If both processors concurrently have reservation status, the first processor to have its request win arbitration to the memory controller will gain exclusive access to the shared memory region.

Upon accessing region 114, the semaphore flag is set and processor 102a gains exclusive access. In response to the write exclusive command, monitor 119 activates the controller to clear the reservation state stored in monitor 119, as well as any reservation to the same address that may have been stored in monitor 120. The locked status of the semaphore is released when the processor that owns the lock writes the semaphore location indicating that the semaphore is no longer locked.

After establishing the reservation, processor 102a may have aborted processing the code sequence, or the code sequence may have been superseded, before a writing operation to the shared memory region has taken place. If the shared memory has not been accessed by any of the processors, the reservation will not have been cleared. As the memory controller monitor is unable to distinguish between whether the reservation was associated with an earlier or later code sequence, protocol requires that an obsolete reservation be cleared before a new reservation can be obtained for subsequent exclusive write access. Thus, if no exclusive write operation for a reservation is to take place, provision must be made to clear the reservation.

In at least one embodiment of the processing system, the semaphore reservation may be cleared by broadcasting a write request to the semaphore memory region 116, but at the same time, prohibiting the processor from writing to the semaphore memory region 116. This may be achieved in a variety of ways. By way of example, the write byte enables may be used to disable all the byte lanes on the data bus during the request by the processor to write to the semaphore memory region 116. As a result, the reservation for the processor is cleared, but the semaphore memory region 116 is not updated, and thereby, remains unlocked for use by another processor.

Figure 3:
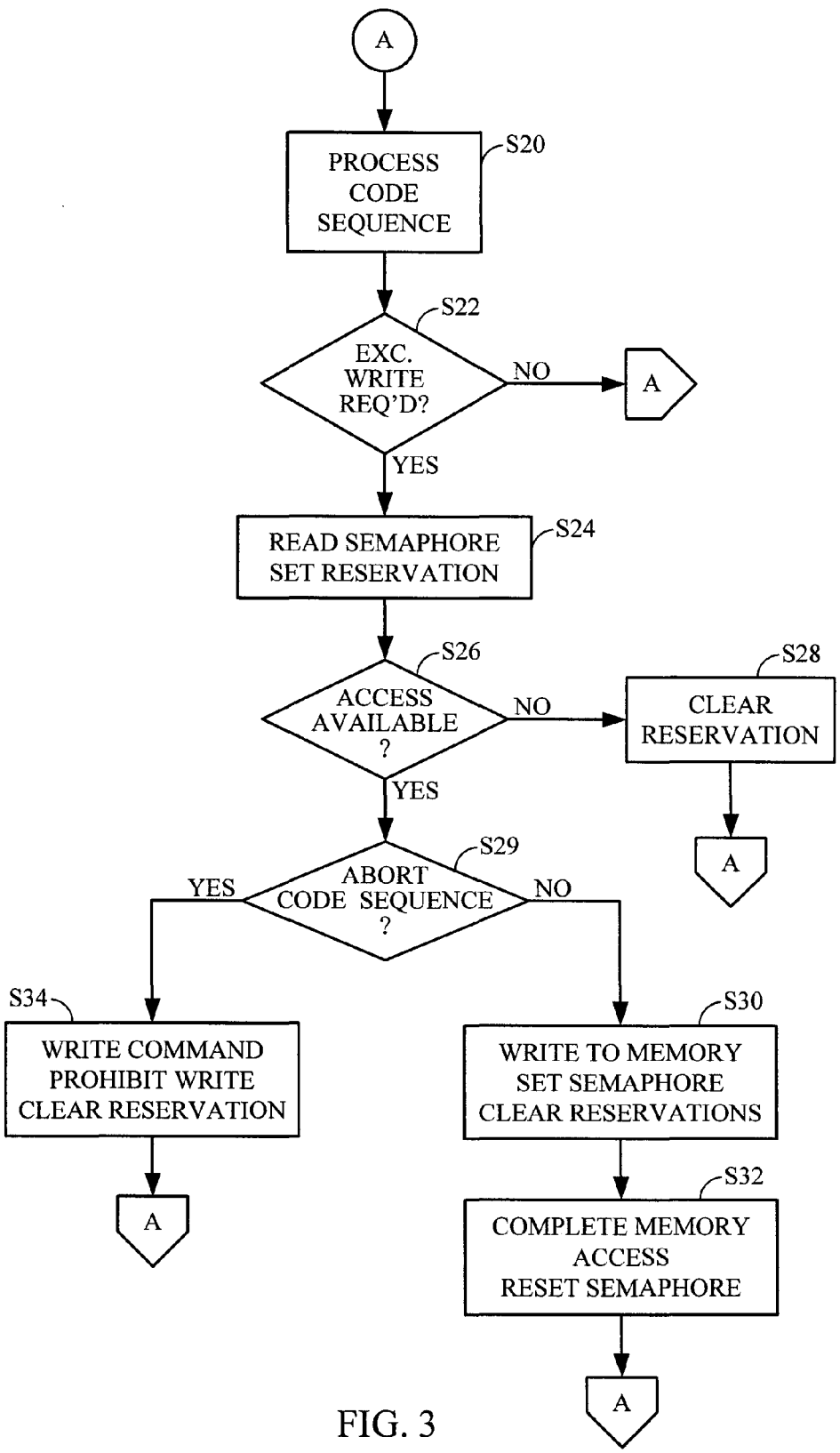
FIG. 3 is a flow diagram illustrating the operation of a processing system.

Semaphore clearance operation is illustrated in the flow chart of FIG. 3. At step S20, processor 102a initiates processing of a code sequence. Determination is made at step S22 as to whether an exclusive write operation to a shared memory address is required by the processor. If not, processing continues until the code sequence processing is completed. If it is determined in step S22 that an exclusive write is required, the processor issues a read command at step S24 to the semaphore address. This command sets a reservation in memory controller monitor 119 that is associated with processor 102a.

At step S26, the semaphore address is read and it is determined whether exclusive access to the shared memory region is available. If not, the reservation is cleared at step S28 and processing flow returns to step S20 to continue processing the code string. If the semaphore does not indicate a locked state, determination is made at step S29 whether the code sequence associated with the reservation has been aborted. If the code sequence is still to be processed, an exclusive write command is issued by processor 102a. Memory controller 104, cognizant of the reservation status of processor 102a set in monitor 119, provides access to the processor to the shared memory region 114 at step S30. The memory controller writes a lock flag to the semaphore memory and clears any existing semaphore reservations. Processor 102a continues to execute the code sequence with exclusive access to the shared memory region. At step S32, the processor has completed its operation sequence and relinquishes exclusive access. Memory controller 104 clears the semaphore flag to indicate that the shared memory is available for access. A new code sequence can be processed at step S20.

If it is determined at step S28 that the code sequence has been aborted, the reservation must be cleared from the memory controller. At step S34, the processor issues an exclusive write command. The processor sets the write byte enables to disable all byte lanes on the data bus. In response to the write command, the memory controller clears the reservation state in monitor 119 and, since there are no bytes lanes enabled, does not write to the semaphore memory region. A new code sequence can be processed at step S20.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of clearing a semaphore reservation for exclusive access to a shared memory, comprising:
    setting a semaphore reservation status for a semaphore memory region associated with the shared memory;
    transmitting a write request to update the semaphore memory region;
    preventing the write request from updating the semaphore memory region; and
    in response to the write request, clearing the semaphore reservation status.

2. A method as recited in claim 1, wherein preventing the write request from updating the semaphore memory region comprises transmitting a control signal which prevents the write request from updating the semaphore memory region.

3. A method as recited in claim 2, wherein the control signal comprises write byte enables.

4. A method as recited in claim 3, wherein a data bus is provided for transmitting data over a plurality of byte lanes to the shared memory, and wherein the contents of the semaphore memory region is prohibited from being updated by one or more processing components by setting the write byte enables to disable all byte lanes on the data bus.

5. A method as recited in claim 4, wherein said semaphore reservation status is associated with a specific processing component from a plurality of processing components and said write request is transmitted from said specific processing component.

6. A method as recited in claim 5, wherein said controller comprises a semaphore reservation status for each of a plurality of processing components and said write request effects a change in the reservation status of the controller only for the processing component that transmitted the write request.

7. A processing system, comprising:

a plurality of processing components;

a memory comprising a shared memory region that can be shared by the plurality of processing components and a semaphore memory region that is indicative of exclusive write access availability of the shared memory portion; and a controller that maintains semaphore reservation status, wherein a reserved status of said controller is cleared in response to a write request to update the semaphore memory region from one of the plurality of processing components without data being written to the semaphore memory region.

8. A processing system as recited in claim 7, wherein said one of the plurality of processing components prevents the write request from updating the semaphore memory region by transmitting a control signal with the write request to the controller.

9. A processing system as recited in claim 8, wherein the control signal comprises write byte enables.

10. A processing system as recited in claim 9, further comprising a data bus between the plurality of processing components and the controller, the data bus having a plurality of byte lanes, and wherein said one of the plurality of processing components prevents data from being written to the semaphore memory region during a write request to the semaphore memory region by setting the write byte enables to disable byte lanes on the data bus.

11. A processing system as recited in claim 8, wherein said controller contains a reservation status for each of a plurality of processing components and said write request effects a change in the reservation status of the controller only for the processing component that transmitted the write request.

12. A processing system, comprising:

a plurality of processing components;

a memory comprising a shared memory region that can be shared by said plurality of processing components and a semaphore memory region that is indicative of exclusive write access availability of the shared memory portion; and a controller that maintains semaphore reservation status;

wherein each of the processing components is configured to transmit a write request to update the semaphored memory region that clears a semaphore reserved status without writing to the semaphore memory region.

13. A processing system as recited in claim 12, wherein each of the processing components is configured to prevent the write request from updating the semaphore memory region by transmitting a control signal with the write request to the controller.

14. A processing system as recited in claim 13, wherein the control signal comprises write byte enables.

15. A processing system as recited in claim 14, further comprising a data bus between the plurality of processing components and the controller, the data bus having a plurality of byte lanes, and wherein each of the processing components is further configured to prevent data from being written to the semaphore memory region during a write request to the semaphore memory region by setting the write byte enables to disable all byte lanes on the data bus.

16. A processing system as recited in claim 13, wherein said controller contains a reservation status for each of the processing components and said write request effects a change in the reservation status of the controller only for the processing component that transmitted the write request.

* * * * *